(12) United States Patent
Scott et al.

(10) Patent No.: US 7,978,312 B2
(45) Date of Patent: Jul. 12, 2011

(54) THREE-DIMENSIONAL RANGE IMAGING APPARATUS AND METHOD

(75) Inventors: Vibart Stan Scott, Westminster, MD (US); James Bryan Blair, Baltimore, MD (US); Luis R. Izquierdo, Washington, DC (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 727 days.

(21) Appl. No.: 11/933,492

(22) Filed: Nov. 1, 2007

(65) Prior Publication Data

US 2010/0296077 A1    Nov. 25, 2010

(51) Int. Cl.
*G01C 3/08* (2006.01)
(52) U.S. Cl. ............... 356/4.01; 356/3.01; 356/3.15; 356/4.1; 356/5.01; 356/5.1
(58) Field of Classification Search ........ 356/3.01–3.15, 356/4.01–4.1, 5.01–5.15, 6–28.5
See application file for complete search history.

(56) References Cited

U.S. PATENT DOCUMENTS

| | | | |
|---|---|---|---|
| 4,380,391 A * | 4/1983 | Buser et al. | 356/5.06 |
| 5,013,151 A * | 5/1991 | Hughes | 356/139.08 |
| 5,682,229 A | 10/1997 | Wangler | |
| 5,870,180 A * | 2/1999 | Wangler | 356/4.01 |
| 5,953,110 A | 9/1999 | Burns | |
| 6,563,105 B2 | 5/2003 | Seibel et al. | |
| 6,664,529 B2 | 12/2003 | Pack et al. | |
| 6,795,199 B2 | 9/2004 | Suhami | |
| 6,873,419 B2 | 3/2005 | Detalle et al. | |
| 7,006,203 B1 | 2/2006 | Book et al. | |
| 7,095,488 B2 | 8/2006 | Jamieson et al. | |
| 7,248,344 B2 | 7/2007 | Morcom | |
| 2002/0060784 A1 | 5/2002 | Pack et al. | |
| 2002/0100884 A1 | 8/2002 | Maddock | |
| 2003/0025917 A1 | 2/2003 | Suhami | |
| 2003/0095266 A1 | 5/2003 | Detalle et al. | |
| 2004/0141170 A1 | 7/2004 | Jamieson et al. | |
| 2005/0058352 A1 | 3/2005 | Deliwala | |
| 2005/0088644 A1 | 4/2005 | Morcom | |
| 2005/0157931 A1 | 7/2005 | Delashmit et al. | |
| 2005/0189503 A1 | 9/2005 | Jamieson et al. | |
| 2006/0050929 A1 | 3/2006 | Rast et al. | |
| 2009/0046296 A1 * | 2/2009 | Kilpatrick et al. | 356/484 |

* cited by examiner

*Primary Examiner* — Thomas H Tarcza
*Assistant Examiner* — Luke D Ratcliffe
(74) *Attorney, Agent, or Firm* — Heather Goo (57) ABSTRACT

A three-dimensional range imager includes a light source for providing a modulated light signal, a multiplexer, an optical fiber connecting the light source to the multiplexer, a plurality of optical fibers connected at first ends to the multiplexer and at second ends to a first fiber array, and a transmitter optic disposed adjacent the first fiber array for projecting a pixel pattern of the array onto a target.

23 Claims, 8 Drawing Sheets

FIG-1

FIG-2 RECEIVER

FIG-8 TRANSMITTER

THREE-DIMENSIONAL RANGE IMAGING APPARATUS AND METHOD

ORIGIN OF INVENTION

The invention described herein was made by employees of the United States Government, and may be manufactured and used by or for the Government for governmental purposes without the payment of any royalties thereon or therefore.

FIELD OF THE INVENTION

The present invention relates in general to range imagers, and in particular, to three-dimensional range imagers.

BACKGROUND

Three-dimensional range imaging is utilized in numerous applications, such as terrestrial surveying, vehicle anti-collision systems, robotic vision and guidance, semi-autonomous and autonomous robotic operations, surface characterization of objects for modification or duplication, and the collection of scientific data for mapping the Earth and other planetary surfaces. Three-dimensional range imaging can also provide valuable scientific information on the atmosphere. Known devices use predominately mechanical scanning, such as galvanometer-controlled mirrors, oscillating or spinning mirrors, rotating optical wedges, nutating mirrors, or other mechanical means for producing a linear displacement of a laser beam for scanning a remote target.

Compared to stationary devices, devices that mechanically displace or project a laser line of sight often weigh more, are larger in size, have limited reliability, have a large number of components, are electro-mechanically complex, produce lower quality images, have shorter life spans, experience momentum induced perturbations, mechanical jitter and thermal-mechanical misalignment, and use more power. By simple replication of single beam laser ranging systems, some stationary devices are able to achieve images having approximately 10 discrete pixels. However, mass, volume, complexity, and cost limit the number of pixels that may be achieved through simple replication. Therefore, there is a need for an inexpensive, lightweight, and reliable range imaging system that produces high quality images including tens, hundreds, or even thousands of pixels.

SUMMARY

In one aspect, a method of range imaging includes providing a modulated light signal, forming a fixed fiber array with ends of optical fibers, switching the modulated light signal successively into a plurality of the optical fibers to form a pixel pattern at the fixed fiber array, and projecting the pixel pattern onto a target.

The method can further include receiving a reflected pixel pattern from the target.

The method can further include imaging the reflected pixel pattern onto only one single-element detector and producing an electrical signal for each pixel in the reflected pixel pattern.

The method can further include, for each pixel in the reflected pixel pattern, determining a distance to the target.

The method can further include, for each pixel in the reflected pixel pattern, comparing distortion of a received signal to a transmitted signal.

The modulated light signal can be temporally modulated and/or frequency modulated.

The method can further include imaging the reflected pixel pattern onto a second fixed fiber array.

The method can further include imaging the reflected pixel pattern of the second fixed fiber array onto only one single-element detector using focusing optics.

The step of switching the modulated light signal successively into a plurality of the optical fibers can be performed with a multiplexer and the method can further include connecting the second fiber array to a de-multiplexer and synchronizing the multiplexer and the de-multiplexer.

The method can further include connecting the de-multiplexer to only one single-element detector with a single fiber.

The method can further include connecting the de-multiplexer to a plurality of single-element detectors with respective single fibers.

The method can further include connecting the second fixed fiber array to a plurality of single-element detectors with respective optical fibers.

In another aspect, a range imager includes a light source for providing a modulated light signal, a multiplexer, an optical wave guide connecting the light source to the multiplexer, a plurality of optical fibers connected at first ends to the multiplexer and at second ends to a first fiber array, and a transmitter optic disposed adjacent the first fiber array for projecting a pixel pattern of the array onto a target.

The range imager can further include a receiving optic for receiving a reflected pixel pattern from the target.

The range imager can further include only one single-element detector for receiving the reflected pixel pattern from the receiving optic and producing an electrical signal for each pixel in the reflected pixel pattern.

The range imager can further include a plurality of light sources for providing a plurality of modulated light signals and, for each light source, an optical wave guide that connects the light source to the multiplexer.

The range imager can further include a second fiber array for receiving the reflected pixel pattern from the receiving optic.

The range imager can further include a focusing optic connected to the second fiber array by a plurality of optical fibers, and only one single-element detector for receiving an image from the focusing optic.

The second fiber array and the first fiber array can include a same number of pixels having a same spatial arrangement.

The range imager can further include a de-multiplexer connected to the second fiber array by a plurality of optical fibers wherein the de-multiplexer is synchronized with the multiplexer.

The range imager can further include only one single-element detector connected to the de-multiplexer with a single optical fiber.

The range imager can further include a plurality of single-element detectors connected to the de-multiplexer with respective optical fibers.

The range imager can further include a plurality of single-element detectors connected to the second fiber array with respective optical fibers.

In a further aspect, a range imager includes a plurality of modulated light sources, a plurality of optical fibers connected at first ends to respective modulated light sources and at second ends to a fixed fiber array, and a transmitter optic disposed adjacent the fiber array for projecting a pixel pattern of the array onto a target.

Further features and advantages of the invention will become apparent from the following detailed description taken in conjunction with the following drawings.

DETAILED DESCRIPTION

Three dimensional images can be produced by projecting light pulses across the area of a target of choice and measuring the time of flight and location of each light pulse. Additional target surface characteristics, such as reflectivity, roughness, and density (of semi-solid objects such as clouds or vegetation) can also be acquired with high resolution and accuracy. Images of a large target area can be acquired without the use of any moving mechanical parts such as moving mirrors or scanning optics. The direction, timing, and beam quality of light emitters can be controlled to produce a controllable illumination pattern. The images produced can cover a wide variety of ranges, angular extents, and resolutions.

A range imager can be scalable to potentially any number of pixels and pixel resolutions and can be compatible with a variety of ranging methodologies including pulsed ranging, single-photon counting, multi-photon counting and encoded or modulated ranging. A range imager can be applied to miniature ranging applications, such as proximity detectors, mobile applications, such as three-dimensional vision systems for automobiles or robotic explorers, and airborne remote sensing applications. Space borne applications can include planetary surface mapping, entry-descent-landing assistance, in-space inspection, and docking. Because there are no moving parts, the range imager is extraordinarily reliable, rugged, and long lasting.

In general, a range imager includes an optical transmitter and an optical receiver. The range imager uses an optical transmitter to project light onto a target of interest. The light is reflected from the target of interest and received using a co-aligned optical receiver. The co-aligned optical receiver records the time history of the reflected light to determine the range and surface characteristics of the target. There are a variety of embodiments for the optical transmitter and a variety of embodiments for the optical receiver.

Figure 1:
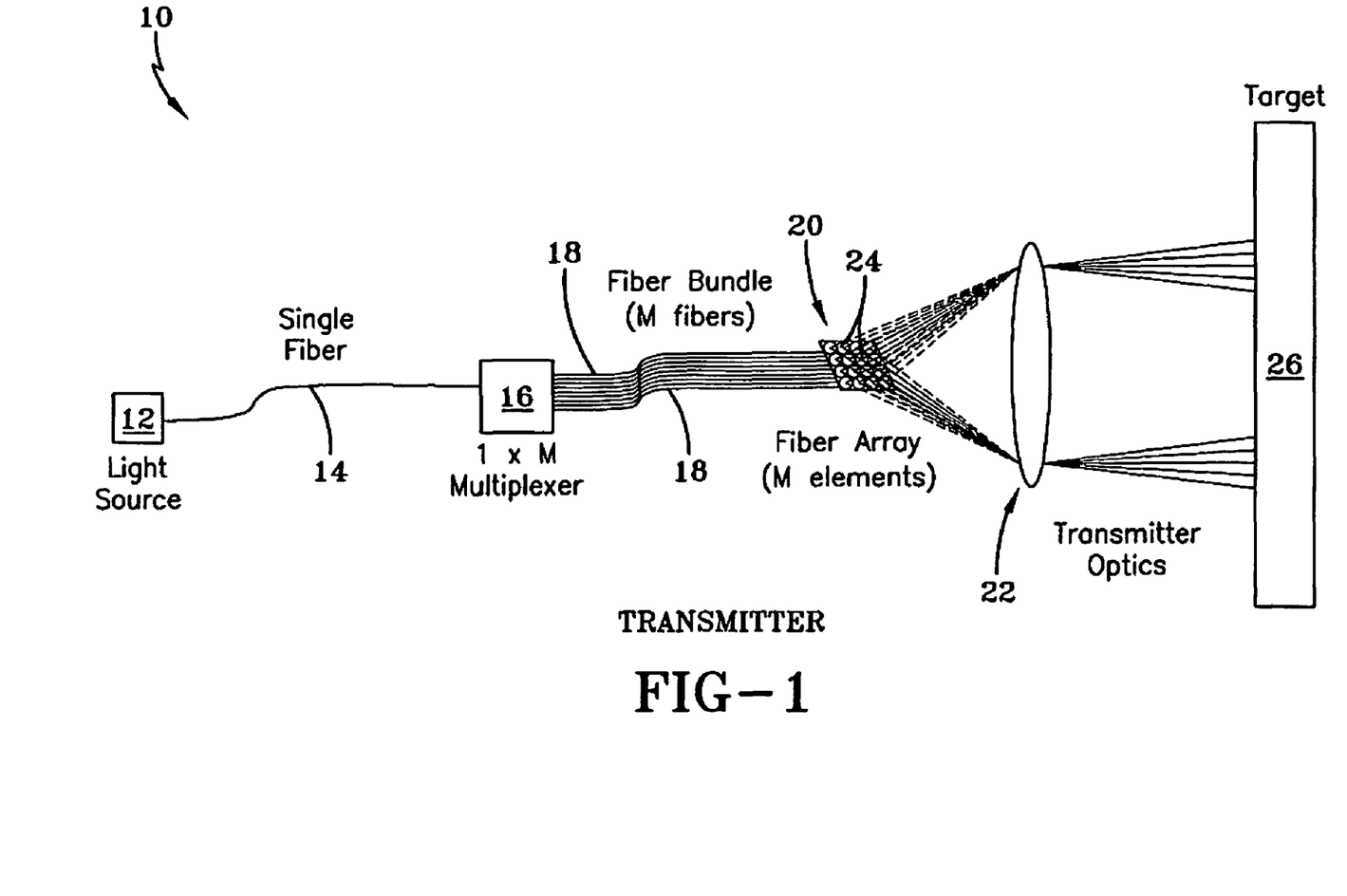
FIG. 1 is a schematic diagram of a first embodiment of a transmitter.

FIG. 1 is a schematic of a first embodiment of a transmitter 10. The transmitter is a combination of devices for generating precise directional illumination. The transmitter 10 includes a light source 12 for providing a temporally modulated light signal. Light source 12 may be, for example, free-space or fiber optic based lasers, diode lasers, fiber amplified lasers, Light Emitting Diodes (LEDs), etc. Other embodiments of the transmitter can include multiple light sources. The light sources can have multiple wavelengths. In addition, one or more of the light sources can be frequency modulated.

An optical waveguide 14 (i.e., optical fiber, single or multimode) couples the modulated light source 12 to an optical multiplexer 16 (i.e., an optical switching device that can be operated in a non-sequential manner), such as a 1×M multiplexer. A plurality of optical fibers 18 are fixed at one end to the multiplexer 16, and at the other end, are bundled into a fixed fiber array 20 of pixels 24. In the case of a 1×M multiplexer 16, the number of fibers 18 can be M such that the fixed fiber array 20 has M pixels 24. Using the multiplexer 16, the modulated light source 12 is switched successively into a plurality of the optical fibers 18 to produce a desired pixel pattern on the fiber array 20.

The desired pixel pattern can, but need not, use all of the available fibers 18, that is, the pixel pattern can include a number of pixels less than M. The choice of pixel pattern depends on the particular application. The sequence of pixel illumination is not fixed and can be varied according to the application or the environmental conditions. For example, if the target surface is moving within the imaging system field of view, the subset of pixels required to illuminate the target can be constantly varied to maintain illumination or permit tracking of a moving target.

Figure 2:
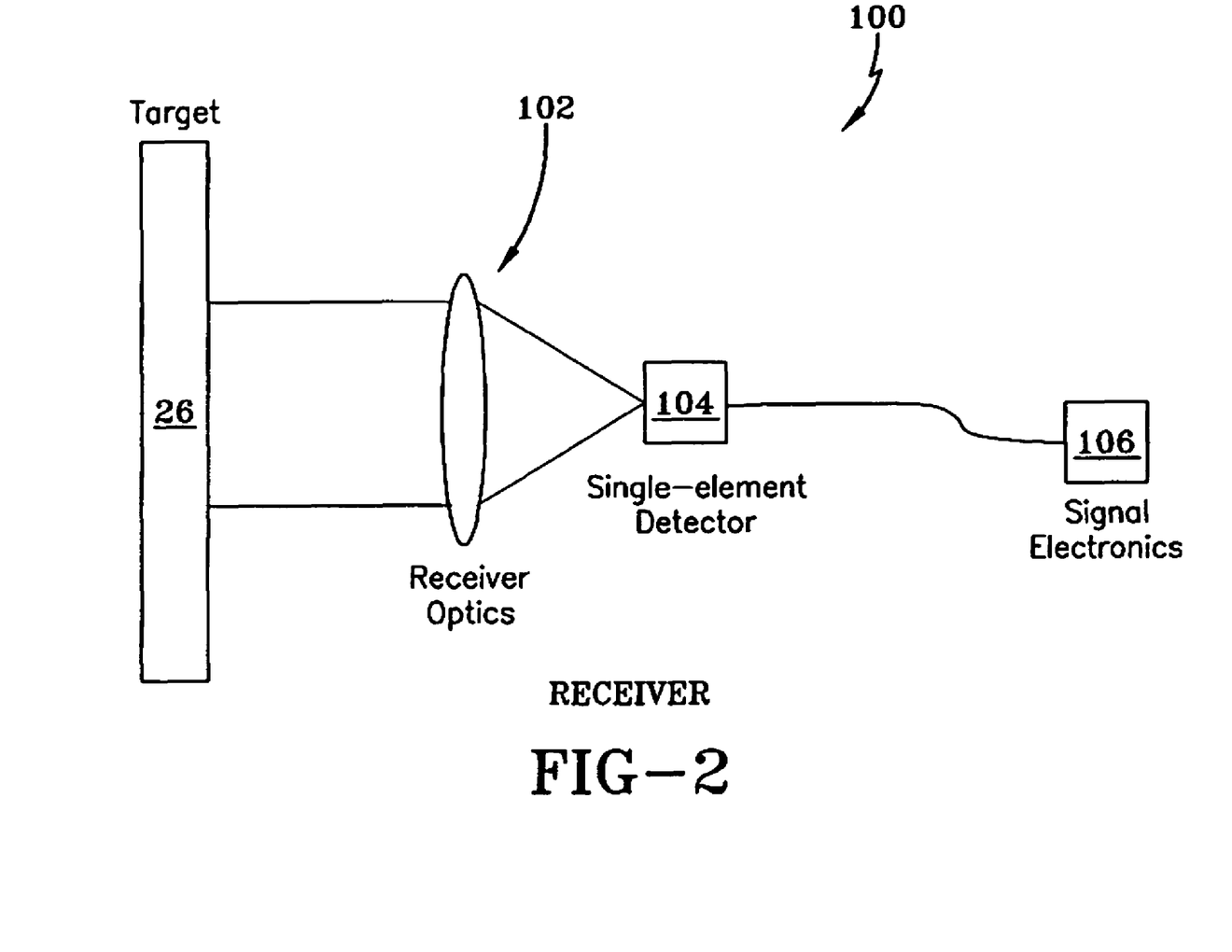
FIG. 2 is a schematic diagram of a first embodiment of a receiver.

A transmitter optic 22, for example, a telescope, projects the pixel pattern onto a target of interest 26. A single optical system can be used to project all of the pixels onto the target. The pixel pattern is reflected from the target 26 and received by a co-aligned receiver. FIG. 2 schematically shows a first embodiment of a receiver 100. Receiver 100 includes a receiver optic 102, such as a lens or telescope that re-images the reflected pixel pattern on to a single element detector 104. A single optical system can be used to re-image all of the pixels from the target. Receiver optic 102 is aligned such that the pixel pattern on the target 26 is in the field of view of the receiver optic 102. The detector 104 generates an electrical signal that is sent to the signal electronics 106.

The time of travel of each light pulse (or modulated light) is used to determine the distance to the target in each pixel of the pixel pattern imaged on the target 26. Each pulse is identified by a transmit (start) time, a pixel position, and a receive (end) time. Pixel position is determined by recording the position of the multiplexer 16 for each pulse. The time interval between light pulses is large enough so that the light pulses are received in the order transmitted. The minimum time interval required is a function of the relative "roughness" of the target surface. In general, the maximum difference in elevation of any two points on the target area determines the minimum time interval required between pulses. If multiple transmit wavelengths are utilized and the return signals are distinguished by wavelength, then the minimum time interval between pulses can be reduced, and thus, the sampling rate increased.

In addition to determining the time of flight and location of each pulse, further information can be obtained by comparing the received signal to the transmitted signal. That is, the distortion of the received signal is analyzed. For example, in the case of a temporally modulated pulse, a widening of the pulse in the received signal is evidence that the target is not flat and/or not smooth. Methods of analyzing signal distortion are known.

Figure 3:
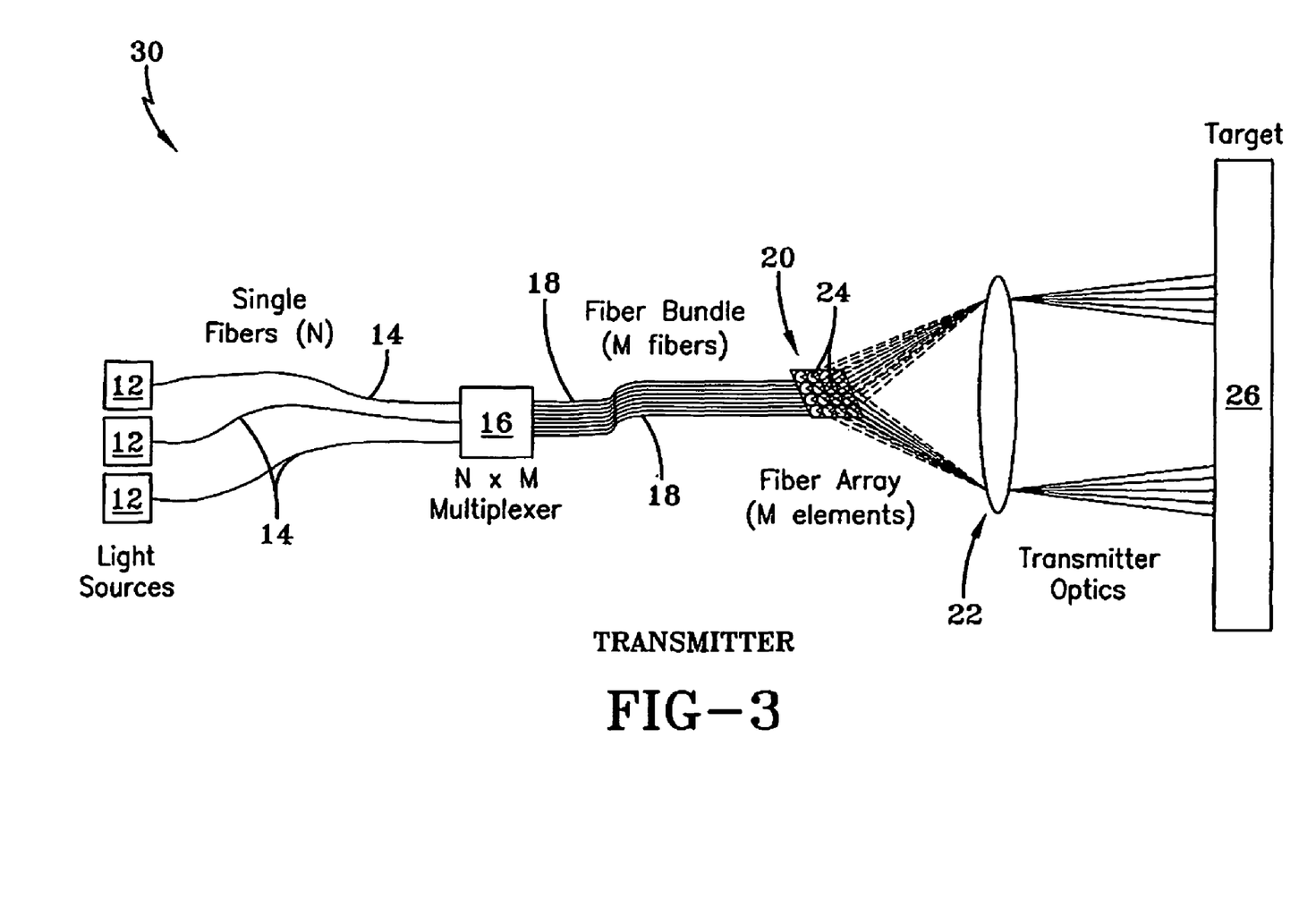
FIG. 3 is a schematic diagram of a second embodiment of a transmitter.

FIG. 3 shows a second embodiment of a transmitter 30. Transmitter 30 is similar to transmitter 10, except that there are multiple light sources 12. The multiple light sources 12 are each connected to the multiplexer 16 by individual optical wave guides, for example, optical fibers 14. In the case of an N number of light sources 12, an N number of fibers 14 connect the N number of sources 12 to the multiplexer 16, which can be an N×M multiplexer. The fixed fiber array 20 can have M number of pixels 24 such that any light source can illuminate any pixel or multiple light sources can simultaneously illuminate any pixel.

The multiple light sources 12 can be used to illuminate the target with multiple optical frequencies. The analysis of multiple optical frequencies can be used to determine chemical composition. Also, multiple light sources 12 can be used to increase the signal power per pixel to thereby enable ranging at longer distances. The maximum operating distance is limited by the light source output power and the light-gathering power of the receiving optics. The operating distance can vary from a few feet, in the case of a proximity detector, to interplanetary distances.

Figure 4:
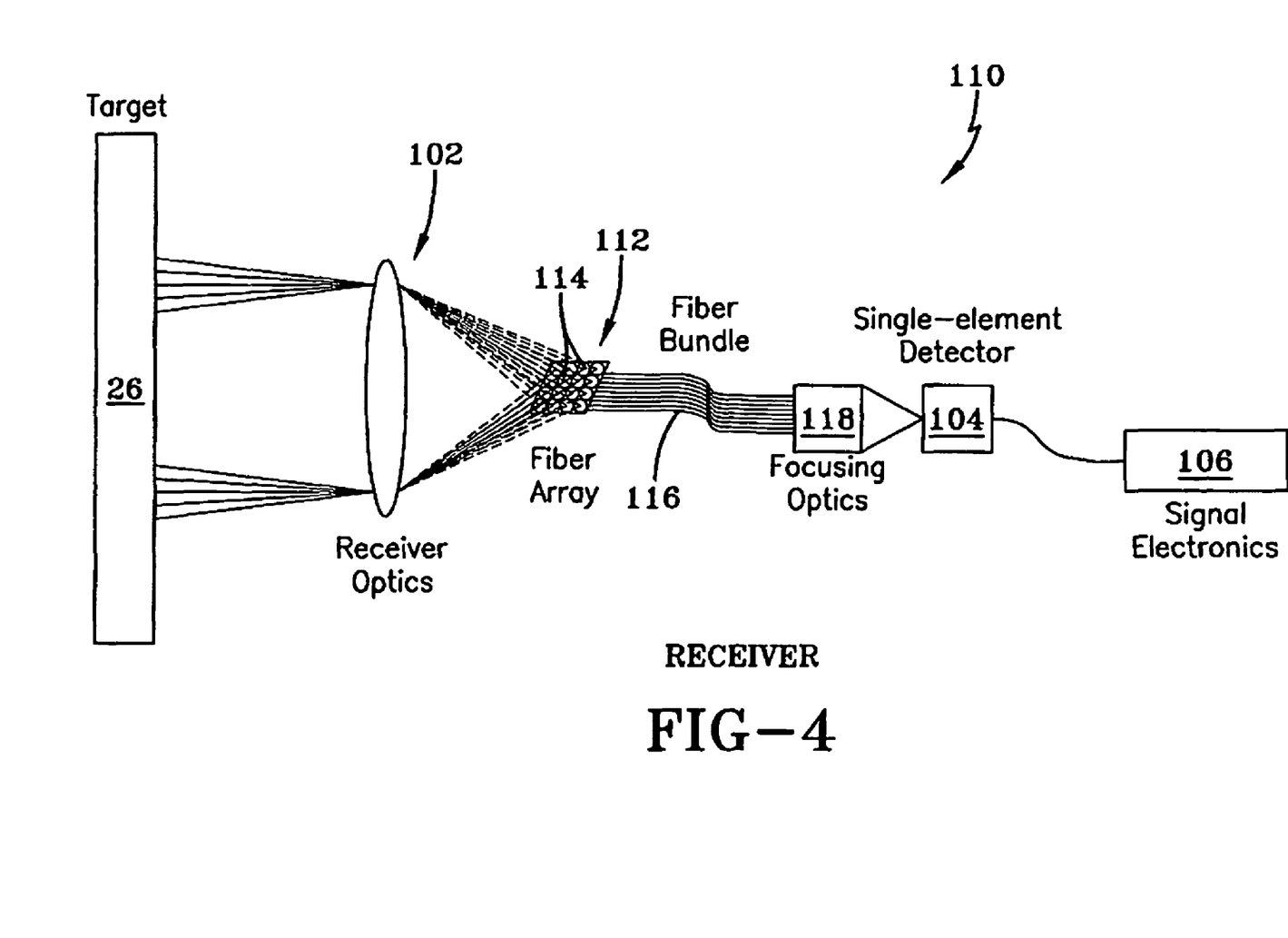
FIG. 4 is a schematic diagram of a second embodiment of a receiver.

FIG. 4 shows a second embodiment of a receiver 110. In receiver 110, the receiving optic 102 re-images the reflected pixel pattern onto a fixed fiber array 112 having pixels 114. Each pixel of fiber array 112 is connected by a fiber 116 to focusing optics 118. The focusing optics 118 re-image the entirety of fibers 116 from fiber array 112 onto the single element detector 104. Use of the fiber array 112 helps to eliminate background lighting from the target 26. The most background lighting can be eliminated, if fiber array 112 includes an array of pixels 114 that is the same in number and spatial arrangement as the pixels 24 of the array 20 of the transmitter 10. In that case, there is a one-to-one correspondence between each pixel 24 of the transmitter 10 and each pixel 114 of the receiver 110.

Figure 5:
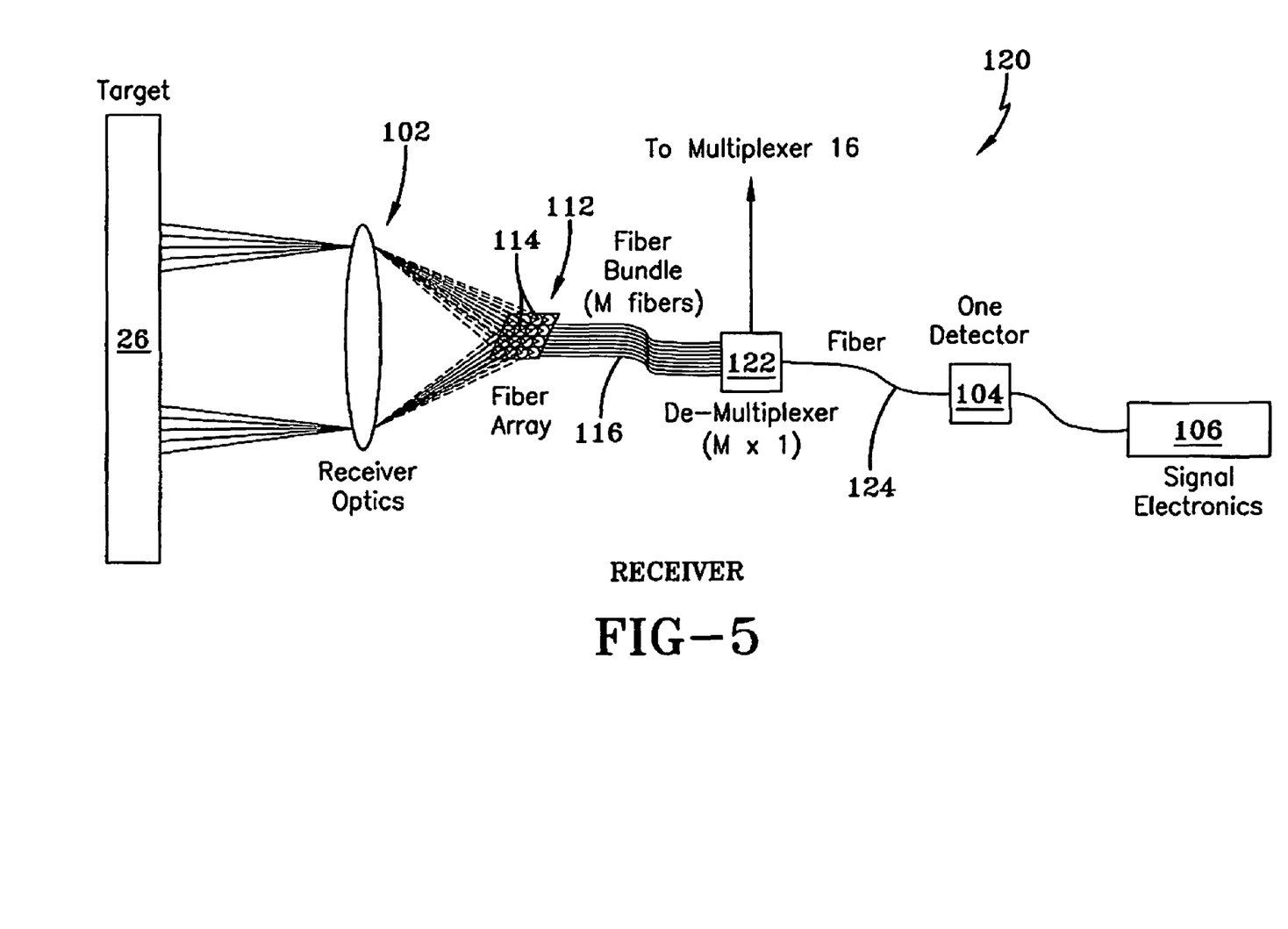
FIG. 5 is a schematic diagram of a third embodiment of a receiver.

FIG. 5 shows a third embodiment of a receiver 120. Receiver 120 is similar to receiver 110, except that a de-multiplexer 122 is substituted for the focusing optics 118. De-multiplexer 122 is connected via optical fiber 124 to only one single-element detector 104. De-multiplexer 122 is synchronized with multiplexer 16 of the transmitter (for example, a transmitter as shown in either FIG. 1 or FIG. 3) to coordinate their operation.

Figure 6:
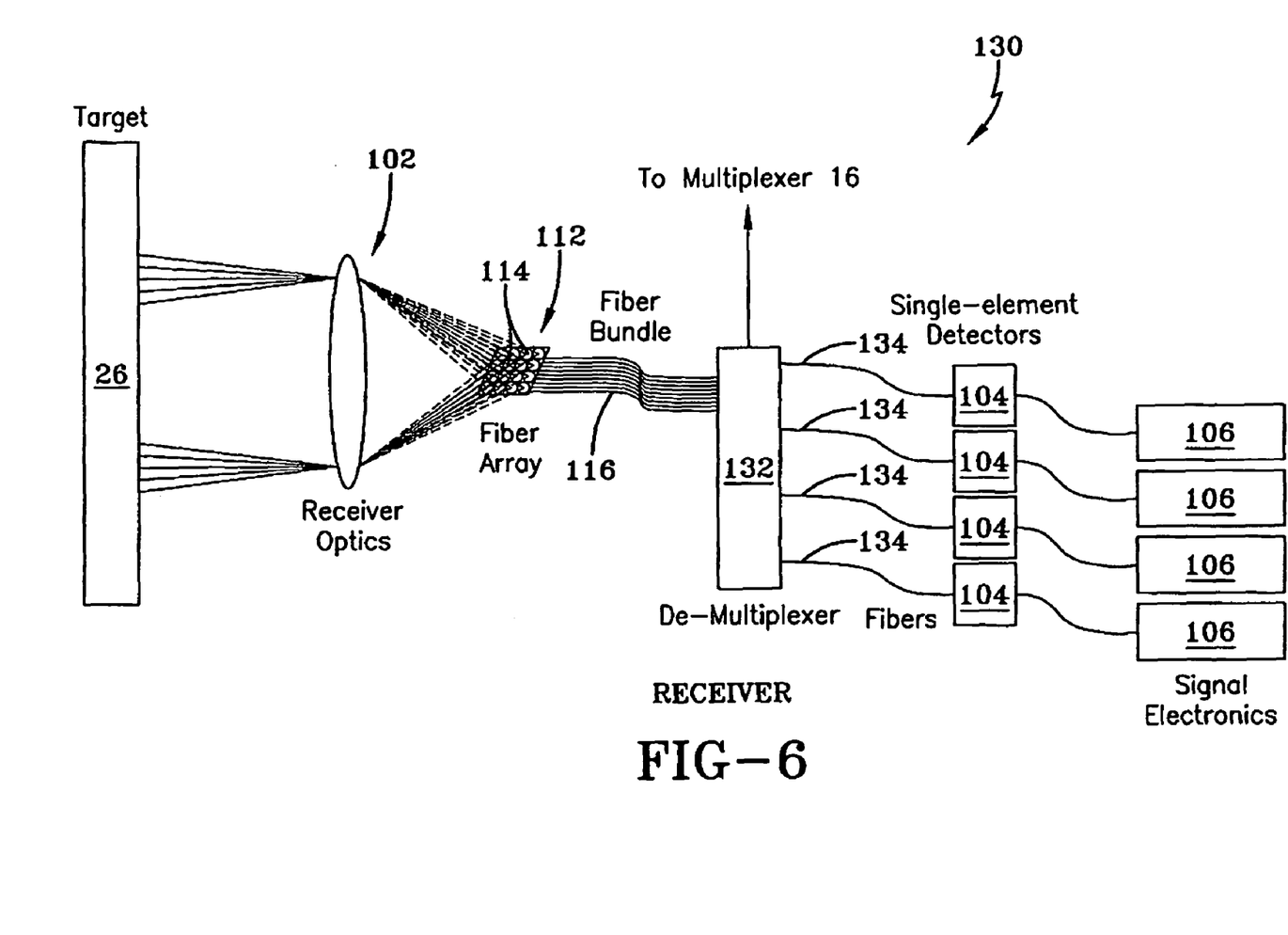
FIG. 6 is a schematic diagram of a fourth embodiment of a receiver.

FIG. 6 shows a fourth embodiment of a receiver 130. Receiver 130 is similar to receiver 120, except that the de-multiplexer 132 is connected to a plurality of single-element detectors 104 by fibers 134, rather than only one single-element detector 104. De-multiplexer 132 is synchronized with multiplexer 16 of the transmitter (for example, a transmitter as shown in either FIG. 1 or FIG. 3) to coordinate their operation. Each single-element detector 104 can be connected to respective signal electronics 106.

Figure 7:
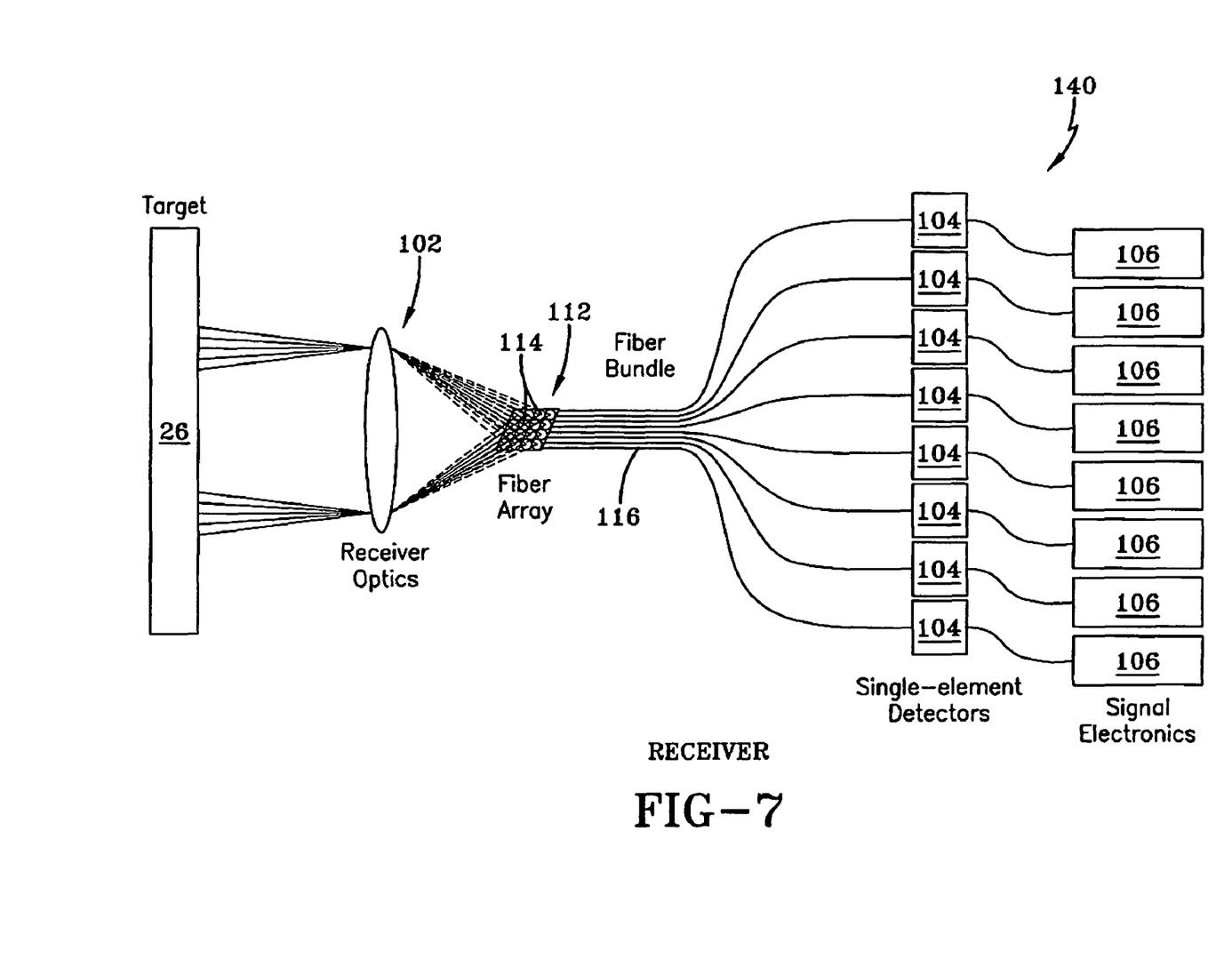
FIG. 7 is a schematic diagram of a fifth embodiment of a receiver.

FIG. 7 shows a fifth embodiment of a receiver 140. Receiver 140 is similar to receiver 130, except that a de-multiplexer is not used. Rather, a single fiber 116 representing a single pixel 114 is directly connected to a single-element detector 104. This requires a single-element detector 104 for each individual pixel 114 in array 112. Alternatively, multiple fibers 116 representing multiple pixels (for example, a row of pixels) can be combined and then directly connected to a single-element detector 104. In this case, the number of single-element detectors 104 is equal to the number of fiber groups (i.e., the number of columns), and is, thus, less than the number of pixels in array 112. Receiver 140 can be combined with a transmitter that illuminates multiple pixels (for example, a column of pixels) simultaneously, but where only one pixel from each group (i.e., row) of receiver fibers is illuminated at one time.

Figure 8:
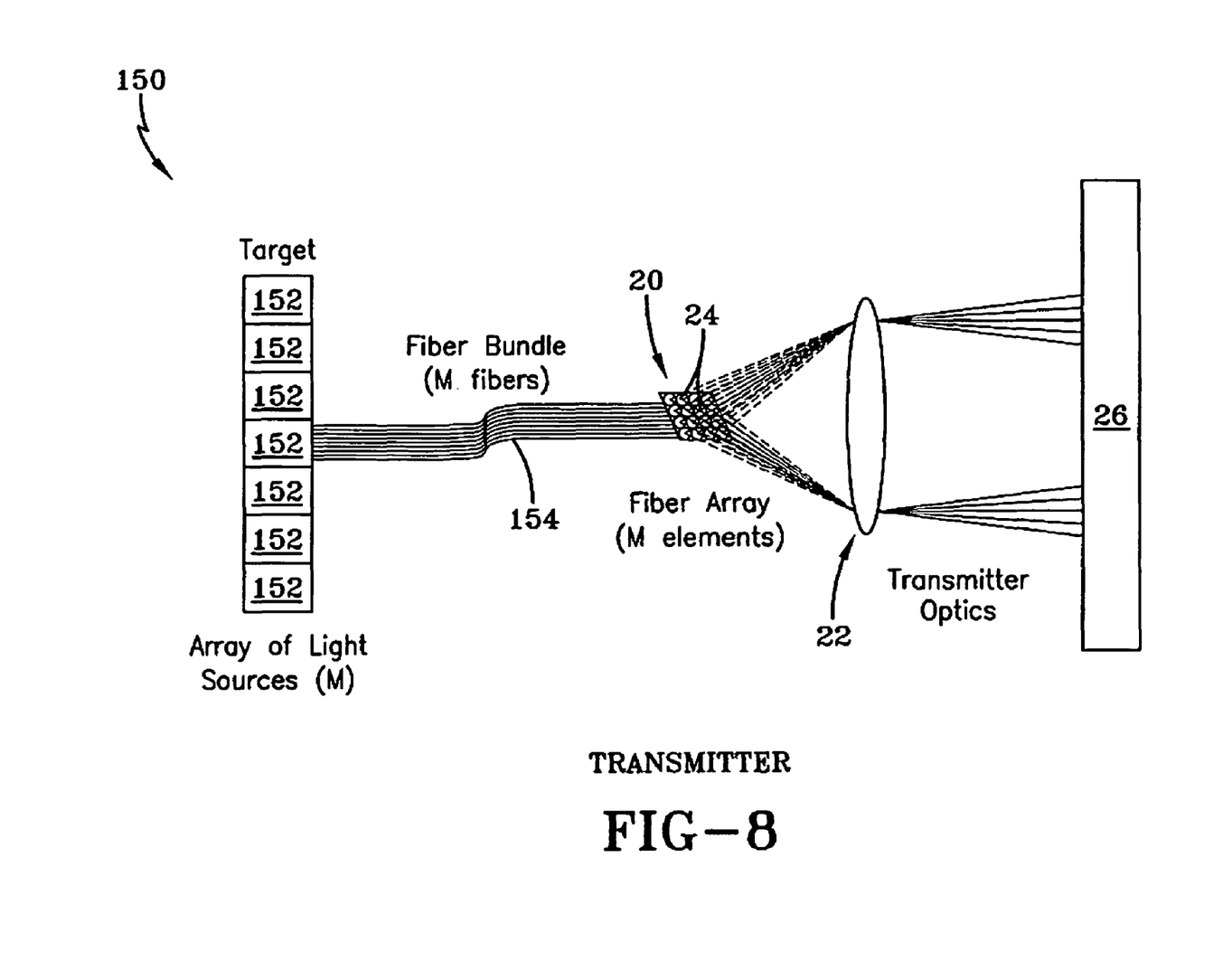
FIG. 8 is a schematic diagram of a third embodiment of a transmitter.

FIG. 8 shows a third embodiment of a transmitter 150 wherein a plurality of modulated light sources 152 are connected via respective optical fibers 154 to fixed fiber array 20. In this embodiment, the number of light sources 152, fibers 154, and pixels 24 of array 20 are the same.

In an alternative embodiment, a transmitter system capable of producing light at multiple wavelengths is used to illuminate the target surface, for example, via any of the aforementioned techniques. The receiver system separates and directs each individual wavelength to one or more single-element detectors. This embodiment can provide enhanced information about the target surface, correction for environmental conditions between the system and the target, or shorter pulse intervals than would be possible with a single light wavelength, due to the surface roughness.

Using the fixed fiber arrays 20, 112 to generate and receive illumination patterns results in a simple, compact, and efficient optical system. In an exemplary embodiment, the range imager has a single optical system for the transmitter and a separate optical system for the receiver. In another exemplary embodiment, the range imager has a single optical system for the transmitter and the receiver. Additionally, the pixel fill factor can be adjusted by de-focusing the transmitter optical system to increase the pixel image size on the target.

Digital control of the selectable optical fiber pathways for the transmit beams and the corresponding detection and location capability as disclosed and described above are not known in the prior art. Such digital control provides images with thousands of pixels.

Conceptually, a 3-D range imaging device and method are analogous to a CCD camera, except that three-dimensional range information is produced. Each fiber of the fiber arrays can be thought of as a pixel of a CCD. Three-dimensional range information provides detailed surface characterization.

Custom 6×6 fiber optic arrays consisting of 36 single-mode fiber optics were fabricated and tested for use as addressable transmitter sources. Receiver arrays, also 6×6, were fabricated using multi-mode fiber optics. Much larger arrays having thousands or more pixels can be fabricated.

Although the above description may contain specific details, these details should not be construed as limiting the claims in any way. Other configurations of the described embodiments of the invention are part of the scope of this invention. Accordingly, the appended claims and their legal equivalents should only define the invention, rather than any specific examples given.

What is claimed is:

1. A method of range imaging, the method comprising:
   providing a modulated light signal;
   forming a fixed fiber array with ends of optical fibers;
   switching the modulated light signal successively into a plurality of the optical fibers to form a pixel pattern at the fixed fiber array;
   projecting the pixel pattern onto a target;
   receiving a reflected pixel pattern from the target; and
   for each pixel in the reflected pixel pattern, comparing distortion of a received signal to a transmitted signal.

2. The method of claim 1, the method further comprising:
   imaging the reflected pixel pattern onto only one single-element detector and producing an electrical signal for each pixel in the reflected pixel pattern.

3. The method of claim 2, the method further comprising:
   for each pixel in the reflected pixel pattern, determining a distance to the target.

4. The method of claim 1, wherein the modulated light signal is temporally modulated.

5. The method of claim 4, wherein the modulated light signal is frequency modulated.

6. The method of claim 1, the method further comprising:
   imaging the reflected pixel pattern onto a second fixed fiber array.

7. The method of claim 6, the method further comprising:
imaging the reflected pixel pattern of the second fixed fiber array onto only one single-element detector using focusing optics.

8. The method of claim 6, wherein switching the modulated light signal successively into a plurality of the optical fibers is performed with a multiplexer, the method further comprising:
connecting the second fiber array to a de-multiplexer and synchronizing the multiplexer and the de-multiplexer.

9. The method of claim 8, the method further comprising:
connecting the de-multiplexer to only one single-element detector with a single fiber.

10. The method of claim 8, the method further comprising:
connecting the de-multiplexer to a plurality of single-element detectors with respective single fibers.

11. The method of claim 6, the method further comprising:
connecting the second fixed fiber array to a plurality of single-element detectors with respective optical fibers.

12. A range imager, the range imager comprising:
a light source for providing a modulated light signal;
a multiplexer; an optical wave guide connecting the light source to the multiplexer;
a plurality of optical fibers connected at first ends to the multiplexer and at second ends to a first fiber array;
a transmitter optic disposed adjacent the first fiber array for projecting a pixel pattern of the array onto a targets a receiving optic for receiving a reflected pixel pattern from the target;
a second fiber array for receiving the reflected pixel pattern from the receiving optic;
a de-multiplexer connected to the second fiber array by a plurality of optical fibers wherein the de-multiplexer is synchronized with the multiplexer; and
only one single-element detector connected to the de-multiplexer with a single optical fiber.

13. The range imager of claim 12, further comprising:
only one single-element detector for receiving the reflected pixel pattern from the receiving optic and producing an electrical signal for each pixel in the reflected pixel pattern.

14. A range imager, the range imager comprising:
a light source for providing a modulated light signal;
a multiplexer; an optical wave guide connecting the light source to the multiplexer;
a plurality of optical fibers connected at first ends to the multiplexer and at second ends to a first fiber array;
a transmitter optic disposed adjacent the first fiber array for projecting a pixel pattern of the array onto a target;
a receiving optic for receiving a reflected pixel pattern from the target;
a second fiber array for receiving the reflected pixel pattern from the receiving optic;
a de-multiplexer connected to the second fiber array by a plurality of optical fibers wherein the de-multiplexer is synchronized with the multiplexer; and
a plurality of single-element detectors connected to the de-multiplexer with respective optical fibers.

15. The range imager of claim 12, the range imager further comprising:
a focusing optic connected to the second fiber array by a plurality of optical fibers; and
only one single-element detector for receiving an image from the focusing optic.

16. The range imager of claim 15, wherein the second fiber array and the first fiber array comprise a same number of pixels having a same spatial arrangement.

17. The range imager of claim 15, the range imager further comprising:
a plurality of single-element detectors connected to the second fiber array with respective optical fibers.

18. The range imager of claim 12, the range imager further comprising:
a plurality of light sources for providing a plurality of modulated light signals; and
for each light source, an optical wave guide that connects the light source to the multiplexer.

19. The range imager of claim 14, further comprising:
only one single-element detector for receiving the reflected pixel pattern from the receiving optic and producing an electrical signal for each pixel in the reflected pixel pattern.

20. The range imager of claim 14, the range imager further comprising:
a focusing optic connected to the second fiber array by a plurality of optical fibers; and
only one single-element detector for receiving an image from the focusing optic.

21. The range imager of claim 20, wherein the second fiber array and the first fiber array comprise a same number of pixels having a same spatial arrangement.

22. The range imager of claim 20, the range imager further comprising:
a plurality of single-element detectors connected to the second fiber array with respective optical fibers.

23. The range imager of claim 14, the range imager further comprising:
a plurality of light sources for providing a plurality of modulated light signals; and
for each light source, an optical wave guide that connects the light source to the multiplexer.

* * * * *